(12) United States Patent  
Zhao

(10) Patent No.: US 9,054,546 B2
(45) Date of Patent: Jun. 9, 2015

(54) PRIMARY-SIDE AND SECONDARY-SIDE FULL-BRIDGE SWITCHING CIRCUIT CONTROLLER FOR A MAGNETIC COUPLING AND CONTACTLESS POWER TRANSMISSION APPARATUS

(75) Inventor: Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 530 days.

(21) Appl. No.: 13/588,298

(22) Filed: Aug. 17, 2012

(65) Prior Publication Data

US 2013/0051083 A1 Feb. 28, 2013

(30) Foreign Application Priority Data

Aug. 30, 2011 (CN) .......................... 2011 1 0270716

(51) Int. Cl.
*H02M 3/337* (2006.01)
*H02J 5/00* (2006.01)

(52) U.S. Cl.
CPC ...................................... *H02J 5/005* (2013.01)

(58) Field of Classification Search
CPC ........... H02M 3/22; H02M 3/24; H02M 3/28; H02M 3/325; H02M 3/335; H02M 3/33523; H02M 3/3353; H02M 3/33569; H02M 3/33576; H02M 3/33592; H02M 3/337; H02M 3/3376; H02M 3/3378; H02M 2001/0058; H02M 1/36; Y02B 70/1491; Y02B 70/1475; H02J 5/005
USPC ............. 363/16, 17, 24, 25, 26, 21.02, 21.03, 363/49, 131, 132
See application file for complete search history.

(56) References Cited

U.S. PATENT DOCUMENTS

2007/0217240 A1* 9/2007 Price et al. ..................... 363/131

* cited by examiner

*Primary Examiner* — Adolf Berhane
*Assistant Examiner* — Jye-June Lee
(74) *Attorney, Agent, or Firm* — Michael C. Stephens, Jr.

(57) ABSTRACT

The present invention relates to a magnetic coupling and contactless power transmission apparatus. In one embodiment, an apparatus can include: a sweep generator to generate a switching pulse signal for operation of bottom switches of a primary-side full-bridge switching circuit; a primary-side switching current zero-crossing detector to generate a primary-side current zero-crossing pulse signal when a primary-side switching current crosses zero; a primary-side PWM signal generator to generate a primary-side PWM signal per an input current to control a shut-off operation of top switches of the primary-side full-bridge switching circuit; in a first operation condition, a frequency of the switching pulse signal is higher than the primary-side current zero-crossing pulse signal, and the switching pulse signal controls a shut-off operation of the bottom switches of the primary-side full-bridge switching circuit.

11 Claims, 13 Drawing Sheets

SECONDARY-
SIDE FIRST TOP
SWITCH
CURRENT
ZERO-CROSSING
DETECTOR 123-1

PRIMARY-SIDE AND SECONDARY-SIDE FULL-BRIDGE SWITCHING CIRCUIT CONTROLLER FOR A MAGNETIC COUPLING AND CONTACTLESS POWER TRANSMISSION APPARATUS

RELATED APPLICATIONS

This application claims the benefit of Chinese Patent Application No. CN201110270716.X, filed on Aug. 30, 2011, which is incorporated herein by reference in its entirety.

FIELD OF THE INVENTION

The present invention relates to the field of power electronics, and more specifically to a magnetic coupling and contactless power transmission apparatus.

BACKGROUND

Magnetic coupled contactless power transmission systems with security electric isolation are mainly applied in relatively poor workplaces, such as mining and underwater environments, to avoid losses that may be caused by various accidents related to electricity leakage, short-circuit, and fire disaster. In addition, a power transmission mode can meet increasing market demands of various consumer electronic products. However, a magnetic coupled contactless power transmission system may be particularly sensitive to a position of a primary-side power transmitter and a secondary-side power receiver due to relatively weak coupling between the primary and secondary-side windings. Also, power transmission efficiency may be relatively low even if the winding placements are balanced due to a relatively low coupling coefficient and relatively large leakage inductance between the primary and secondary-side windings.

SUMMARY

In one embodiment, a magnetic coupling and contactless power transmission apparatus can include: (i) a sweep generator configured to generate a switching pulse signal to control operation of bottom switches of a primary-side full-bridge switching circuit during an initial operation process; (ii) a primary-side switching current zero-crossing detector configured to generate a primary-side current zero-crossing pulse signal when a primary-side switching current crosses zero; (iii) a primary-side pulse-width modulation (PWM) signal generator configured to generate a primary-side PWM signal in accordance with an input current to control a shut-off operation of top switches of the primary-side full-bridge switching circuit; (iv) where when in a first operation condition, a frequency of the switching pulse signal is higher than the primary-side current zero-crossing pulse signal, and the switching pulse signal is configured to control a shut-off operation of the bottom switches of the primary-side full-bridge switching circuit; and (v) where when in a second operation condition, a frequency of the switching pulse signal is lower than the primary-side current zero-crossing pulse signal, and the primary-side current zero-crossing pulse signal is configured to control the shut-off operation of the bottom switches to maintain a power transmitter in a resonant state and an output voltage of the primary-side full-bridge switching circuit in phase with a current of a primary-side transmitter winding.

Embodiments of the present invention can advantageously provide several advantages over conventional approaches. For example, a magnetic coupled contactless power transmission system of particular embodiments can capture a resonant frequency of the system by regulating the system frequency during an initial operation time, and maintaining a voltage of both primary-side and secondary-side in phase with a current, to keep the system working in the resonant state to achieve maximum transmission efficiency. Other advantages of the present invention will become readily apparent from the detailed description of preferred embodiments below.

DETAILED DESCRIPTION

Figure 1:
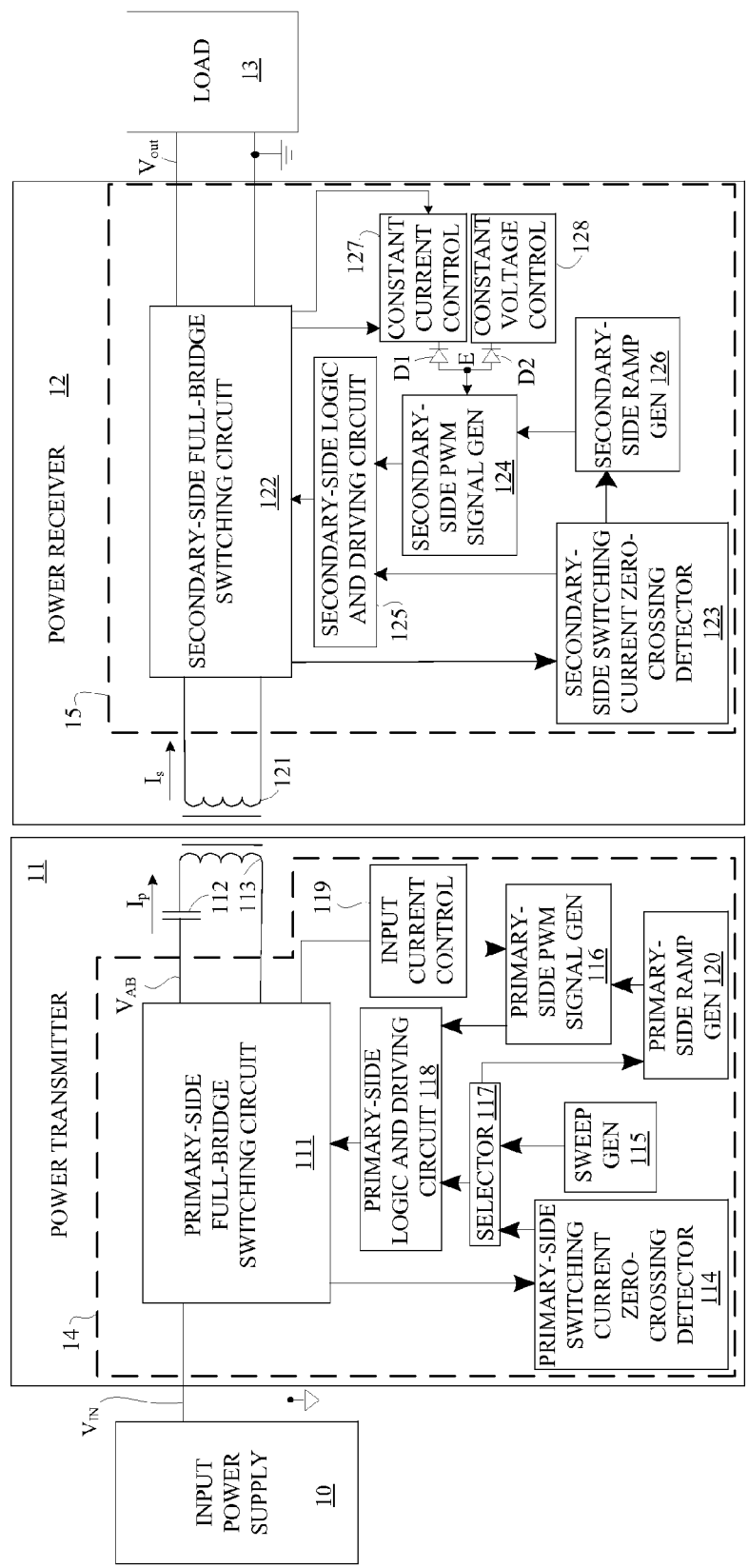
FIG. 1 shows a block diagram of an example magnetic coupling and contactless power transmission apparatus in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to actively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. For example, a magnetic coupled contactless power transmission system of particular embodiments can capture a resonant frequency of the system by regulating the system frequency during an initial operation time, and maintaining a voltage of both primary-side and secondary-side in phase with a current, to keep the system working in the resonant state to achieve maximum transmission efficiency. The invention, in its various aspects, will be explained in greater detail below with regard to exemplary embodiments.

In order to improve power transmission efficiency, appropriate control methods may be utilized to keep the primary-side and the secondary-side working in a resonant state. Examples of control modes that may be utilized include constant-frequency control mode and variable-frequency control mode. For constant-frequency control mode, the resonance frequency of the secondary-side can vary with temperature rise caused by power losses of components, and as such it may be different from the resonance frequency of the primary-side, possibly adversely affecting power transmission. In contrast, the variable-frequency control mode can achieve maximum power transmission by controlling the resonance frequency of the primary-side to follow the resonance frequency of the secondary-side.

In one embodiment, a magnetic coupling and contactless power transmission apparatus can include: (i) a sweep generator configured to generate a switching pulse signal to control operation of bottom switches of a primary-side full-bridge switching circuit during an initial operation process; (ii) a primary-side switching current zero-crossing detector configured to generate a primary-side current zero-crossing pulse signal when a primary-side switching current crosses zero; (iii) a primary-side pulse-width modulation (PWM) signal generator configured to generate a primary-side PWM signal in accordance with an input current to control a shut-off operation of top switches of the primary-side full-bridge switching circuit; (iv) where when in a first operation condition, a frequency of the switching pulse signal is higher than the primary-side current zero-crossing pulse signal, and the switching pulse signal is configured to control a shut-off operation of the bottom switches of the primary-side full-bridge switching circuit; and (v) where when in a second operation condition, a frequency of the switching pulse signal is lower than the primary-side current zero-crossing pulse signal, and the primary-side current zero-crossing pulse signal is configured to control the shut-off operation of the bottom switches to maintain a power transmitter in a resonant state and an output voltage of the primary-side full-bridge switching circuit in phase with a current of a primary-side transmitter winding.

An example magnetic coupling and contactless power transmission apparatus may start the system by a sweep generator, and keep the system working in resonant state by a primary-side switching current zero-crossing detector. Thus, even when positions of the primary-side winding and the secondary-side winding or other components are changed, the output voltage of the primary-side full-bridge switching circuit may be regulated in phase with the output current, and the system can function in a resonant state to improve transmission efficiency. A supplemented input current controller, constant current controller, and constant voltage controller can make the apparatus suitable for more applications. Further, the power transmitter and power receiver of the present invention can integrate the primary-side circuits and secondary-side circuits in an integrated circuit (IC) to decrease the apparatus size and improve power density. Particular embodiments can overcome disadvantages of conventional approaches by applying a variable-frequency control mode to meet requirements of high transmission efficiency, stability, low cost, and small volume.

With reference to FIG. 1, a block diagram of a magnetic coupling and contactless power transmission apparatus in accordance with embodiments of the present invention is shown. The apparatus of the example of FIG. 1 can include power transmitter 11 and power receiver 12. Power transmitter 11 and power receiver 12 may be coupled in series between input power supply 10 and load 13 for receiving a power supply from input power supply 10 and transferring the power supply to load 13.

Power transmitter 11 can include primary-side full-bridge switching circuit 111, resonant capacitor 112, primary-side transmitter winding 113, primary-side switching current zero-crossing detector 114, sweep generator 115, primary-side PWM signal generator 116, selector 117, primary-side logic and driving circuit 118, input current controller 119, and primary-side ramp generator 120. For example, primary-side full-bridge switching circuit 111, primary-side switching current zero crossing detector 114, sweep generator 115, primary-side PWM driving controller 116, selector 117, primary-side logic and driving circuit 118, input current controller 119, and primary-side ramp generator 120 male be integrated into a primary-side high power density power management IC 14.

The input terminal of primary-side full-bridge switching circuit 111 can be coupled to input power supply 10 for receiving input voltage $V_{IN}$, while the output terminal can be coupled to resonant capacitor 112 and primary-side transmitting winding 113 for outputting a high frequency square-wave voltage signal $V_{AB}$. Resonant capacitor 112 and primary-side transmitting winding 113 can be connected in series for receiving high frequency square-wave voltage signal $V_{AB}$ and generating a high frequency sinusoidal primary-side current signal $I_P$.

In order to achieve maximum transmission efficiency during the process of power transmission, it may be preferable to keep the system working in a resonant state by controlling operation of primary-side full-bridge switching circuit 111. For example, the operation of primary-side full-bridge switching circuit 111 can be controlled by primary-side switching current zero-crossing detector 114, sweep generator 115, primary-side PWM signal generator 116, selector 117, primary-side logic and driving circuit 118, input current controller 119, and primary-side ramp generator 120.

Figure 2:
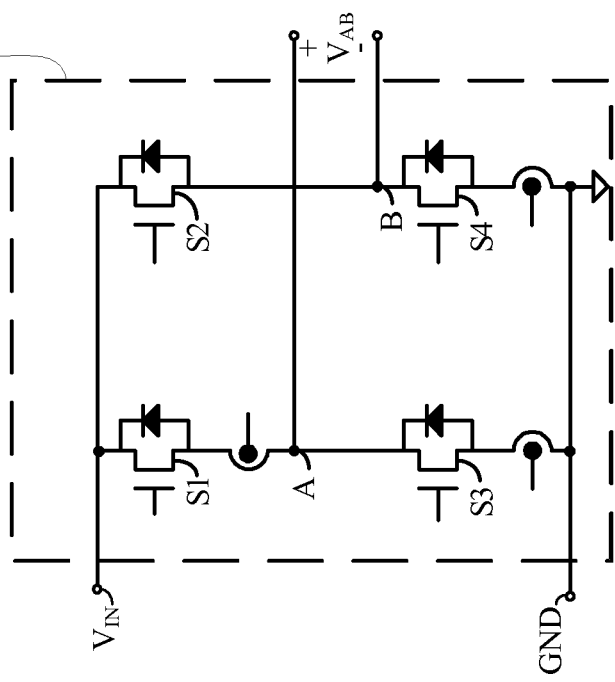
FIG. 2 shows a schematic diagram of an example primary-side full-bridge switching circuit in accordance with embodiments of the present invention.

With reference to FIG. 2, a schematic diagram of an example primary-side full-bridge switching circuit in accordance with embodiments of the present invention is shown. This example primary-side full-bridge switching circuit can include primary-side first top switch S1, primary-side second top switch S2, primary-side first bottom switch S3, and primary-side second bottom switch S4. For example, primary-side first top switch S1 can connect to primary-side first bottom switch S3 with common node A, primary-side second top switch S2 can connect to primary-side second bottom switch S4 with common node B, primary-side first top switch S1 and primary-side second top switch S2 may be connected together with input voltage $V_{IN}$, and primary-side first bottom switch S3 and primary-side second bottom switch S4 may be connected together at ground. The voltage across common node A and common node B can be outputted as a high frequency square-wave voltage signal $V_{AB}$. In this example, high frequency square-wave voltage signal $V_{AB}$ may be generated by turning on and turning off the switches.

With reference from FIG. 3A to FIG. 7, example operation processes for controlling the switches in primary-side full-bridge switching circuit 111 will be discussed. At an initial operation of process, sweep generator 115 may be used to generate two switching signals from high frequency to low frequency, and the two switching signals can be provided to control operation of primary-side bottom switches.

Figure 3A:
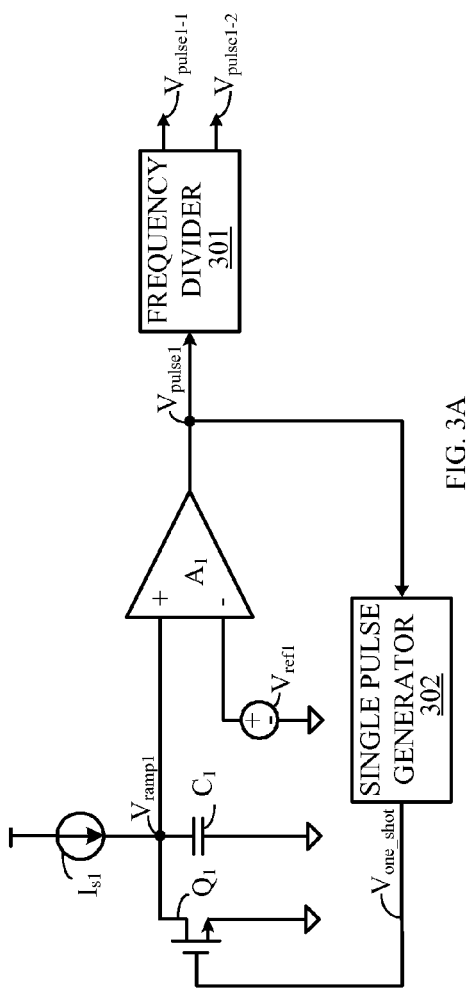
FIG. 3A shows a block diagram of an example sweep generator in accordance with embodiments of the present invention.

With reference to FIG. 3A, a block diagram of an example sweep generator in accordance with embodiments of the present invention is shown. This example sweep generator can include first adjustable current source $I_{s1}$, first switch $Q_1$, first capacitor $C_1$, first comparator $A_1$, first reference voltage $V_{ref1}$, frequency divider 301, and single pulse generator 302. First adjustable current source $I_{s1}$ can connect in series with first capacitor $C_1$, first switch $Q_1$ can connect in parallel with first capacitor $C_1$. Also, the common node of first switch $Q_1$, first capacitor $C_1$ and first adjustable current source $I_{s1}$ can connect with the non-inverting input terminal of first comparator $A_1$. In addition, first reference voltage $V_{ref1}$ can connect with the inverting input terminal of first comparator $A_1$, the output terminal of first comparator $A_1$ can connect to frequency divider 301 and single pulse generator 302, and the output terminal of single pulse generator 302 can connect with the control terminal of first switch $Q_1$.

Figure 3B:
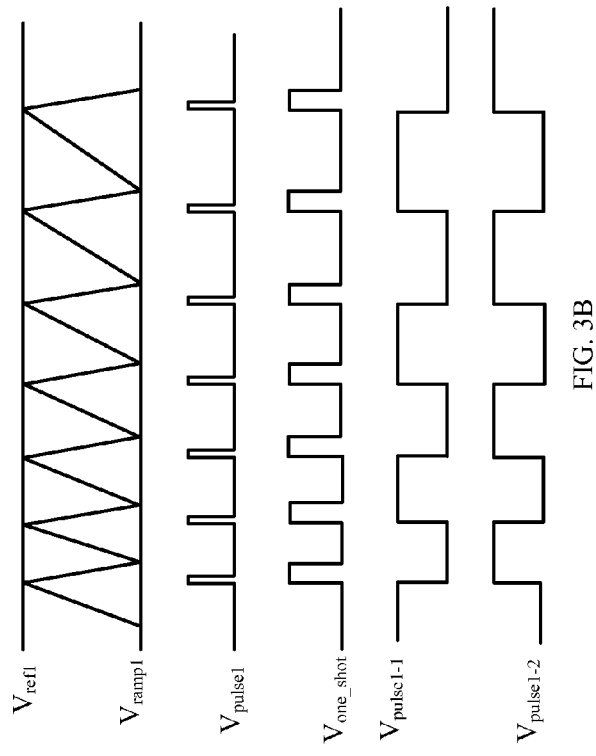
FIG. 3B shows example operation waveforms of the example sweep generator shown in FIG. 3A.

FIG. 3B shows an example operation waveforms of the sweep generator shown in FIG. 3A. The example operation process of sweep generator 115 can include first adjustable current source $I_{s1}$ providing charging current for first capacitor $C_1$. When the voltage of first capacitor $C_1$ is charged to first reference voltage $V_{ref1}$, first comparator $A_1$ can output a first pulse signal $V_{pulse1}$ to frequency divider 301 and single pulse generator 302. Then, single pulse generator 302 may be triggered to output a single pulse signal $V_{one\_shot}$ when receiving a rising edge of first pulse signal $V_{pulse1}$ to turn on first switch $Q_1$, and first capacitor $C_1$ can begin to discharge when first switch $Q_1$ is turned on.

A first ramp voltage signal $V_{ramp1}$ may be generated by charging and discharging first capacitor $C_1$. At the same time, frequency divider 301 can output two switching pulse signals $V_{pulse1-1}$ and $V_{pulse1-2}$ when receiving a rising edge of first pulse signal $V_{pulse1}$. The operation can be cycled thereafter. During the operation process, the charging time of first capacitor $C_1$ can be changed by regulating the charging current of first adjustable current source $I_{s1}$ from relatively large to relatively small. This can mean the rising slope of first ramp voltage signal $V_{ramp1}$ is changed, and thus the frequency of first pulse signal $V_{pulse1}$ can vary from high to low, causing the frequency of switching pulse signals $V_{pulse1-1}$, $V_{pulse1-2}$ to vary from high to low. Consequently, the switching frequency of primary-side first bottom switch S3 and primary-side second bottom switch S4 can be changed from high to low.

Figure 4A:
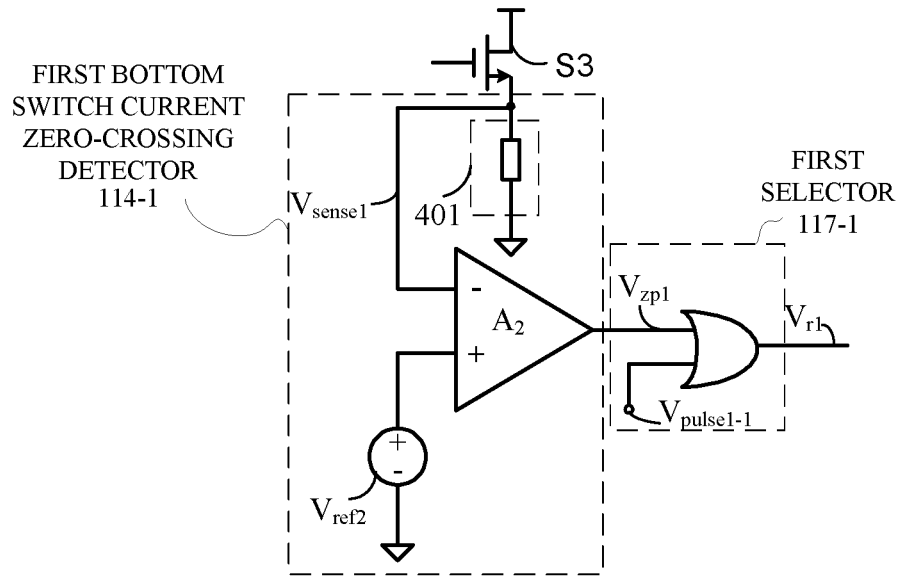
FIG. 4A shows a schematic diagram of an example primary-side first bottom switch current zero-crossing detector in accordance with embodiments of the present invention.
Figure 4B:
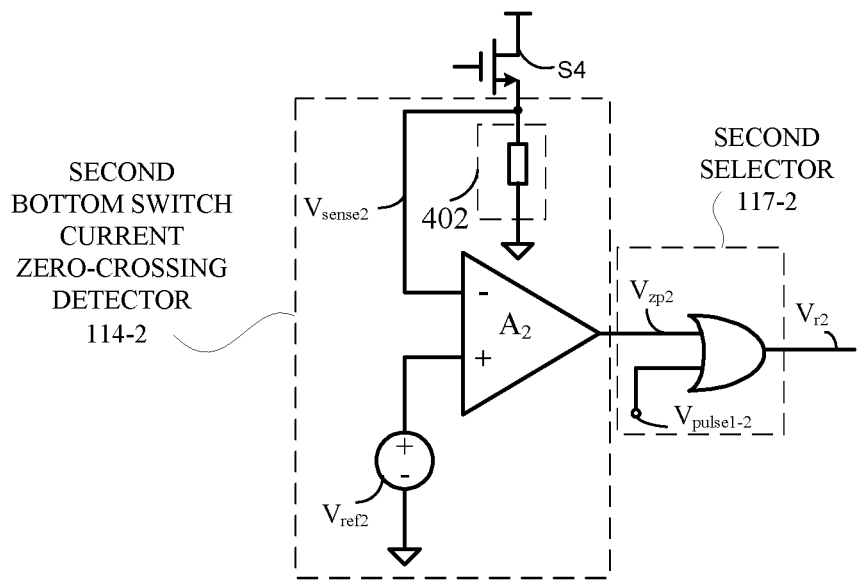
FIG. 4B shows a schematic diagram of an example primary-side second bottom switch current zero-crossing detector in accordance with embodiments of the present invention.
Figure 4C:
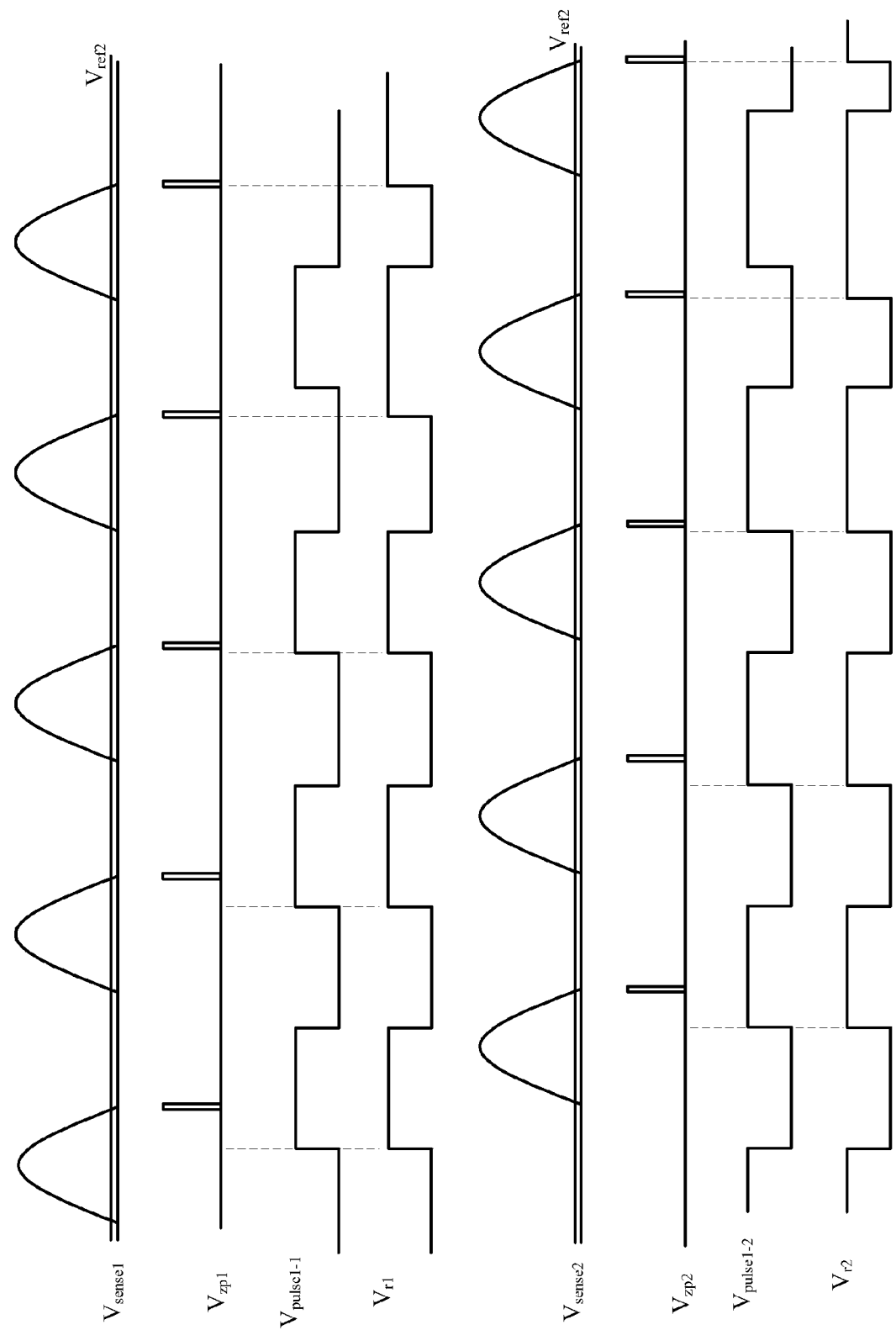
FIG. 4C shows example operation waveforms of detecting a current of primary-side bottom switches in accordance with embodiments of the present invention.

With reference to FIG. 4A, FIG. 4B and FIG. 4C, during the process of regulating the switching frequency, primary-side switching current zero-crossing detector 114 can detect a current of primary-side first bottom switch $S_3$ and primary-side second bottom switch $S_4$ separately by first bottom switch current zero-crossing detector 114-1 and second switch current zero-crossing detector 114-2.

With reference to FIG. 4A, a schematic diagram of an example first bottom switch current zero-crossing detector in accordance with embodiments of the present invention is shown. First bottom switch current zero-crossing detector 114-1 can include first current sampling circuit 401, second comparator $A_2$ and second reference voltage $V_{ref2}$. The first current sampling circuit 401 can connect with the source of primary-side first bottom switch S3 and the inverting input terminal of second comparator $A_2$, and the second reference voltage $V_{ref2}$ can connect with the non-inverting input terminal of second comparator $A_2$.

Viewed in combination with FIG. 4C that shows example operation waveforms of detecting the current of primary-side first bottom switch S3, the operation process can be described as follows. First current sampling circuit 401 may be applied for detecting the current flowing through primary-side first bottom switch S3 to generate a first sense voltage $V_{sense1}$. Also, second comparator $A_2$ can compare first sense voltage $V_{sense1}$ and second reference voltage $V_{ref2}$ to generate a primary-side first bottom switch current zero-crossing signal $V_{zp1}$. In order to determine the reset signal for primary-side bottom switches, a first selector 117-1 may be used as shown in FIG. 4A. The first selector 117-1 can receive primary-side first bottom switch current zero-crossing signal $V_{zp1}$ and first switching pulse signal $V_{pulse1-1}$ to generate a first reset signal $V_{r1}$, where first reset signal $V_{r1}$ may be used to turn off primary-side first bottom switch S3.

With reference to FIG. 4C, when the frequency of first switching pulse signal $V_{pulse1-1}$ is higher than the frequency of primary-side first bottom switch current zero-crossing signal $V_{zp1}$ during the initial operation time, first selector 117-1 can output first reset signal $V_{r1}$ according to first switching pulse signal $V_{pulse1-1}$. When the frequency of first switching pulse signal $V_{pulse1-1}$ is lower than the frequency of primary-side first bottom switch current zero-crossing signal $V_{zp1}$, first selector 117-1 can first reset signal $V_{r1}$ according to primary-side first bottom switch current zero-crossing signal $V_{zp1}$.

The circuit structure and operation process of primary-side second bottom switch current zero-crossing detector 114-2 as shown in FIG. 4B and FIG. 4C may be substantially the same or similar to the primary-side first bottom current zero-crossing detector 114-1. Second current sampling circuit 402 can be connected with primary-side second bottom switch S4 that may be used for generating a second sense voltage $V_{sense2}$ to the inverting input of second comparator $A_2$. Second comparator $A_2$ may be used to generate a primary-side second bottom switch current zero-crossing signal $V_{zp2}$ by comparing second sense voltage $V_{sense2}$ and second reference voltage $V_{ref2}$. Second selector 117-2 may be used to generate a second reset signal $V_{r2}$ according to primary-side second bottom switch current zero-crossing signal $V_{zp2}$ and second switching pulse signal $V_{pulse1-2}$.

In the example operation process described above, a frequency of the magnetic coupling and contactless power transmission apparatus can reach a resonant frequency, and voltage signal $V_{AB}$ of primary-side full-bridge switching circuit 111 can be kept in phase with primary-side current signal $I_p$ when the frequency of primary-side first bottom switch current zero-crossing signal $V_{zp1}$ and primary-side second bottom switch current zero-crossing pulse signal $V_{zp2}$ are separately higher than the frequency of first switching pulse signal $V_{pulse1-1}$ and second switching pulse signal $V_{pulse1-2}$. During the steady state, primary-side first bottom switch S3 and primary-side second bottom switch S4 may be turned off in accordance with primary-side first bottom switch current zero-crossing signal $V_{zp1}$ and primary-side second bottom switch current zero-crossing pulse signal $V_{zp2}$, and power transmitter 11 may be maintain in resonant state to achieve improved transmission efficiency.

Figure 5A:
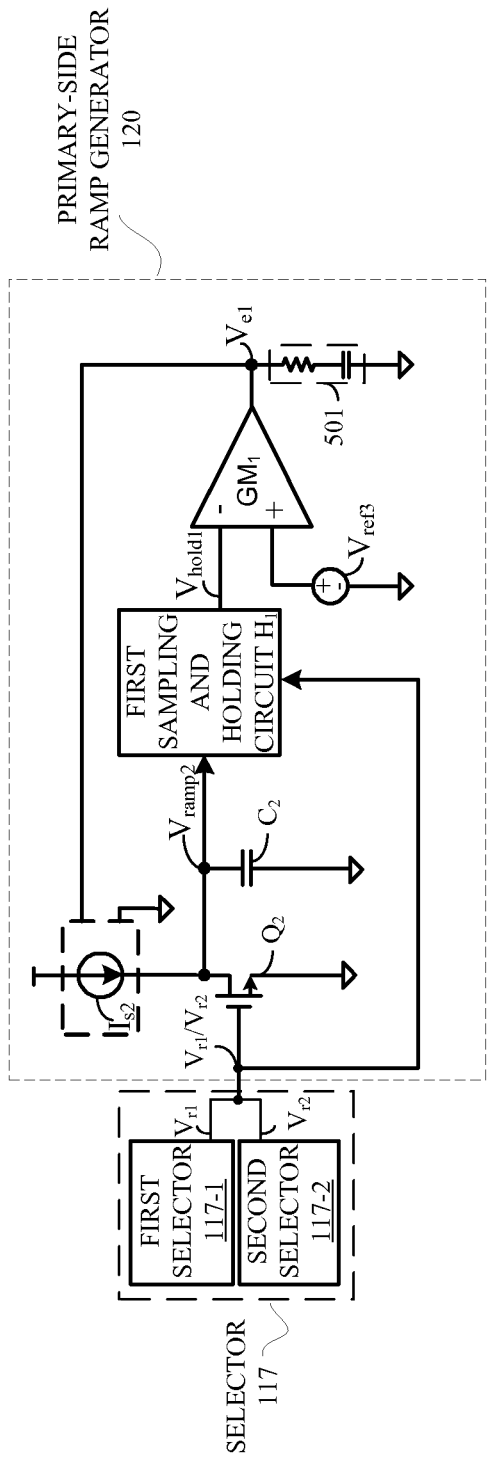
FIG. 5A shows a block diagram of an example primary-side ramp generator in accordance with embodiments of the present invention.

With reference to FIG. 5A, a block diagram of an example primary-side ramp generator in accordance with embodiments of the present invention is shown. This example primary-side ramp generator can include second adjustable current source $I_{s2}$, second switch $Q_2$, second capacitor $C_2$, first sampling and holding circuit $H_1$, first operational transconductance amplifier $GM_1$, third reference voltage $V_{ref3}$, and first compensator 501.

Second adjustable current source $I_{s2}$ can connect with second switch $Q_2$, and second capacitor $C_2$ can connect in parallel with second switch $Q_2$, at a common node. This common node of second adjustable current source $I_{s2}$, second switch $Q_2$ and second capacitor $C_2$ may be coupled to first sampling and holding circuit $H_1$. An output terminal of first sampling and holding circuit $H_1$ can connect to the inverting input terminal of first operational transconductance amplifier $GM_1$. Also, third reference voltage $V_{ref3}$ can connect with the non-inverting input terminal of first operational transconductance amplifier $GM_1$. The output terminal of first operational transconductance amplifier $GM_1$ may be coupled to first compensator 501 and the control terminal of second adjustable current source $I_{s2}$.

Figure 5B:
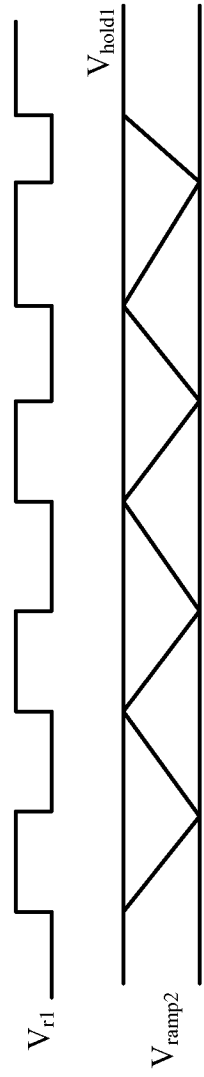
FIG. 5B shows example operation waveforms of a primary-side ramp generator in accordance with embodiments of the present invention.

Viewed in combination with FIG. 5B showing example operation waveforms of the primary-side ramp generator 120, the example operation process of the primary-side ramp generator 120 will now be described. Second adjustable current source $I_{s2}$ can provide a charging current for second capacitor $C_2$, the charging and discharging of second capacitor $C_2$ may be controlled by second switch $Q_2$, and second switch $Q_2$ can be controlled by first reset signal $V_{r1}$ or second reset signal $V_{r2}$. For example, when first reset signal $V_{r1}$ is low, second switch $Q_2$ may be off, second adjustable current source $I_{s2}$ can provide charging current for second capacitor $C_2$, and the voltage across second capacitor $C_2$ can begin rising. When first reset signal $V_{r1}$ turns to high, second switch $Q_2$ may be turned on, second capacitor $C_2$ can begin discharging, and the voltage across second capacitor $C_2$ may also begin to fall. In this way, second ramp voltage $V_{ramp2}$ can be generated.

At the same time when first reset signal $V_{r1}$ turns high, first sampling and holding circuit $H_1$ may be triggered to sampling and holding a peak value of second ramp voltage $V_{ramp2}$ and generating a first holding voltage $V_{hold1}$. First operational transconductance amplifier $GM_1$ can compare the first holding voltage $V_{hold1}$ with third reference voltage $V_{ref3}$ to generate a first error voltage $V_{e1}$ after being compensated by first compensator 501. In this way, the peak value of second ramp voltage $V_{ramp2}$ can be maintained substantially constant for achieving improved precision and stability of the system. Also, first error voltage $V_{e1}$ can be fed back to second adjustable current source $I_{s2}$ for regulating the charging current. The operation process can be substantially the same or similar when second reset signal $V_{r2}$ is used to control second switch $Q_2$. Also, for controlling the input current of power transmitter 11, input current controller 119 (see, e.g., FIG. 1, FIG. 6) can be used.

Figure 6:
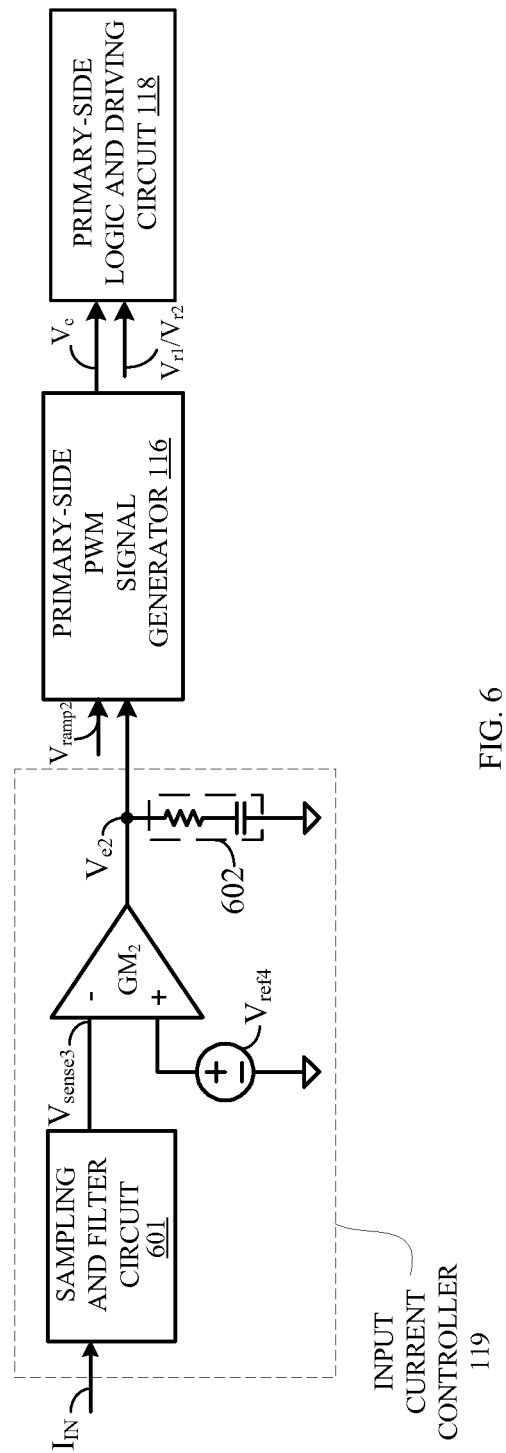
FIG. 6 shows a block diagram of an example input current controller in accordance with embodiments of the present invention.

With reference to FIG. 6, a block diagram of an example input current controller 119 in accordance with embodiments of the present invention is shown. This example input current controller can include sampling and filter circuit 601, second operational transconductance amplifier $GM_2$, fourth reference voltage $V_{ref4}$, and second compensator 602. Sampling and filter circuit 601 may be coupled to the inverting input of second operational transconductance amplifier $GM_2$, and fourth reference voltage $V_{ref4}$ can connect with the non-inverting input of second operational transconductance amplifier $GM_2$. Also, the output of second operational transconductance amplifier $GM_2$ can be coupled to second compensator 602 and primary-side PWM signal generator 116.

One example operation process can be described as follows. Sampling and filter circuit 601 may receive input current $I_{IN}$ of power transmitter 11 and generate a third sense voltage $V_{sense3}$. Second operational transconductance amplifier $GM_2$ can compare the third sense voltage $V_{sense3}$ with fourth reference voltage $V_{ref4}$, and may be compensated by second compensator 602 to generate second error voltage $V_{e2}$. After being compensated by second compensator 602, second error voltage signal $V_{e2}$ can be inputted to primary-side PWM signal generator 116 together with second ramp voltage $V_{ramp2}$ generated by primary-side ramp generator 120 for outputting a primary-side PWM signal $V_c$. Also, primary-side PWM signal $V_c$ may be used to turn off the primary-side top switches.

When input current signal $I_{IN}$ is increasing, third sense voltage $V_{sense3}$ can also increase, which can lead to second error voltage $V_{e2}$ decreasing. Then, primary-side PWM signal generator 116 can generate a primary-side PWM signal $V_c$ with a shorter duty time or duty cycle to turn off the primary-side first top switch for reducing input current $I_{IN}$. In this way, input current $I_{IN}$ may be controlled.

Figure 7:
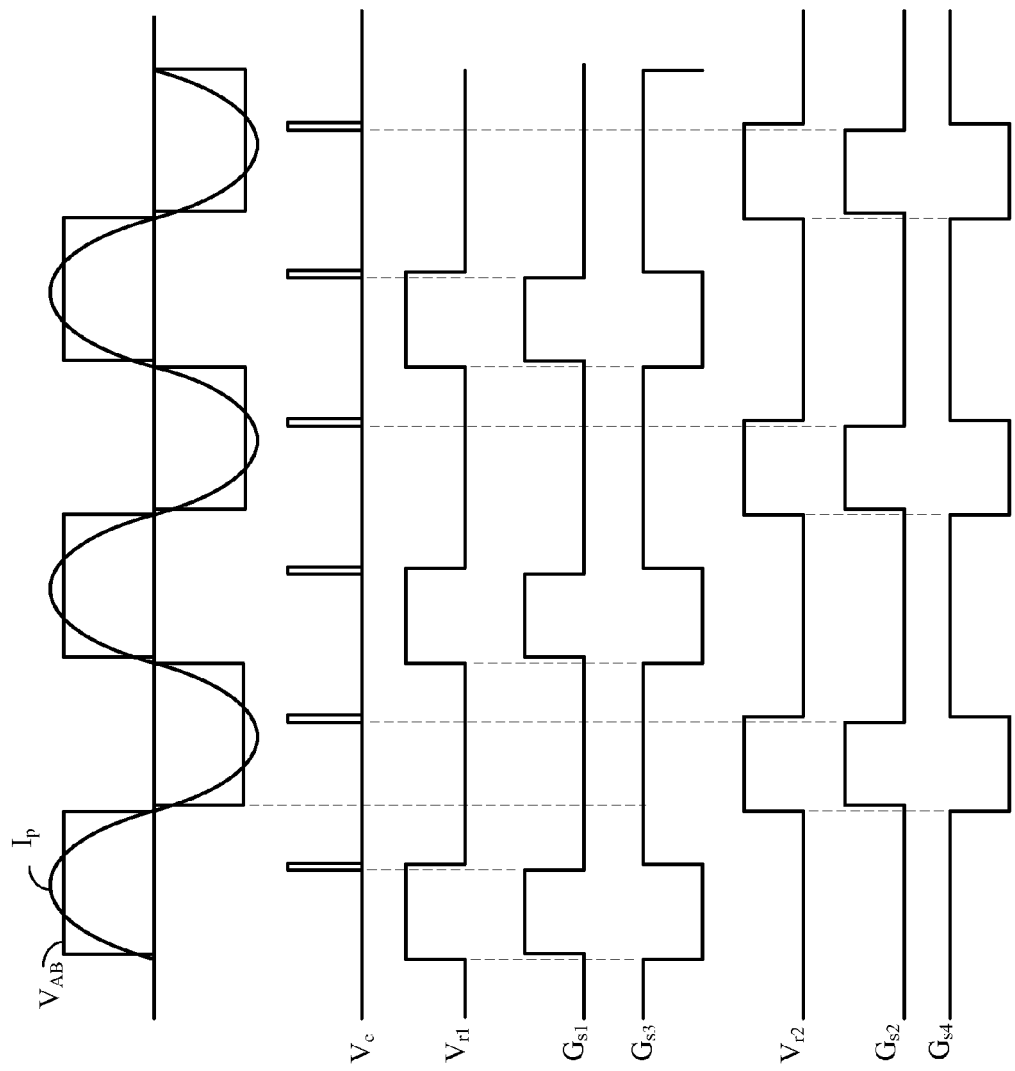
FIG. 7 shows example operation waveforms of control signals for a primary-side logic and driving circuit and for switches of a primary-side full-bridge switching circuit during a resonant state, in accordance with embodiments of the present invention.

With reference to FIG. 7, example operation control signals for the primary-side logic and driving circuit 118 and for switches of the primary-side full-bridge switching circuit 111 during the resonant state, in accordance with embodiments of the present invention is shown. In this example, primary-side first control signal $G_{s1}$, primary-side second control signal $G_{s2}$, primary-side third control signal $G_{s3}$, and primary-side fourth control signal $G_{s4}$ may be generated by primary-side logic and driving circuit 118 according to first reset signal $V_{r1}$, the second reset signal $V_{r2}$, and primary-side PWM signal $V_c$. Primary-side first control signal $G_{s1}$ may be applied to control primary-side first top switch S1, primary-side second control signal $G_{s2}$ may be applied to control primary-side second top switch S2, primary-side third control signal $G_{s3}$ may be applied to control primary-side first bottom switch S3, and primary-side fourth control signal $G_{s4}$ may be applied to control primary-side second bottom switch S4.

One example operation during the resonant state can be described as follows. When primary-side logic and driving circuit 118 receives first reset signal $V_{r1}$, third primary-side third control signal $G_{s3}$ can go low to turn off primary-side first bottom switch S3. Then after a dead time, primary-side first control signal $G_{s1}$ can go high to turn on primary-side first top switch S1. Primary-side first top switch S1 may be turned off until primary-side PWM signal $V_c$ is received. After a dead time, primary-side third control signal $G_{s3}$ can go high for turning on primary-side first bottom switch S3. Then primary-side first bottom switch S3 may be turned off again until primary-side first reset signal $V_{r1}$ is received. The example operation of primary-side second top switch S2 and primary-side second bottom switch S4 may be the same or substantially similar to the operation of primary-side first top switch S1 and primary-side first bottom switch S3. It can be seen from FIG. 7 that high frequency square-wave voltage signal $V_{AB}$ may be controlled in phase with current signal $I_P$ during the resonant state.

Referring back to FIG. 1 again, power receiver 12 can include secondary-side receiving winding 121, secondary-side full-bridge switching circuit 122, secondary-side switching current zero crossing detector 123, secondary-side PWM signal generator 124, secondary-side logic and driving circuit 125, secondary-side ramp generator 126, constant current controller 127, constant voltage controller 128, first diode D1, and second diode D2. Secondary-side full-bridge switching circuit 122, secondary-side switching current zero crossing detector 123, secondary-side PWM signal generator 124, secondary-side logic and driving circuit 125, secondary-side ramp generator 126, constant current controller 127, constant voltage controller 128, first diode D1 and second diode D2 may be integrated in a secondary-side high power density power management IC 15.

The input of secondary-side full-bridge switching circuit 122 can be coupled to secondary-side receiving winding 121 to receive secondary-side current signal $I_s$, which may be induced from primary-side current signal $I_P$. The output of secondary-side full-bridge switching circuit 122 may be applied to supply power for load 13. To keep power receiver 12 working in a resonant state and in phase with the power transmitter 11 to achieve maximum transmission efficiency, the switches of secondary-side full-bridge switching circuit 122 can be appropriately controlled. For example, the operation of secondary-side full-bridge switching circuit 122 can be controlled by secondary-side switching current zero crossing detector 123, secondary-side PWM signal generator 124, secondary-side logic and driving circuit 125, secondary-side ramp generator 126, constant current controller 127, constant voltage controller 128, first diode D1, and second diode D2.

Figure 8:
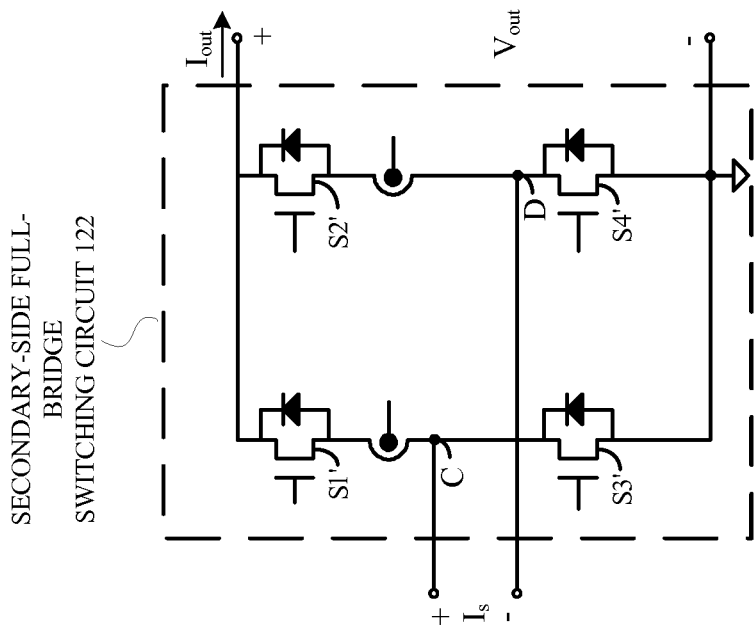
FIG. 8 shows a schematic diagram of an example secondary-side full-bridge switching circuit in accordance with embodiments of the present invention.

With reference to FIG. 8, a schematic diagram of an example secondary-side full-bridge switching circuit in accordance with embodiments of the present invention is shown. This example secondary-side full-bridge switching circuit can include secondary-side first top switch S1', secondary-side second top switch S2', secondary-side first bottom switch S3', and secondary-side second bottom switch S4'. Common node C of secondary-side first top switch S1' and secondary-side first bottom switch S3', and common node D of secondary-side second top switch S2' and secondary-side second bottom switch S4', may be applied for receiving secondary-side current signal $I_s$. The voltage across secondary-side second top switch S2' and secondary-side second bottom switch S4' may be used as output voltage $V_{out}$ for load 13.

With reference to FIG. 9A through FIG. 12, and example operation process for controlling the switches of secondary-side full-bridge switching circuit 122 will be described.

Figure 9A:
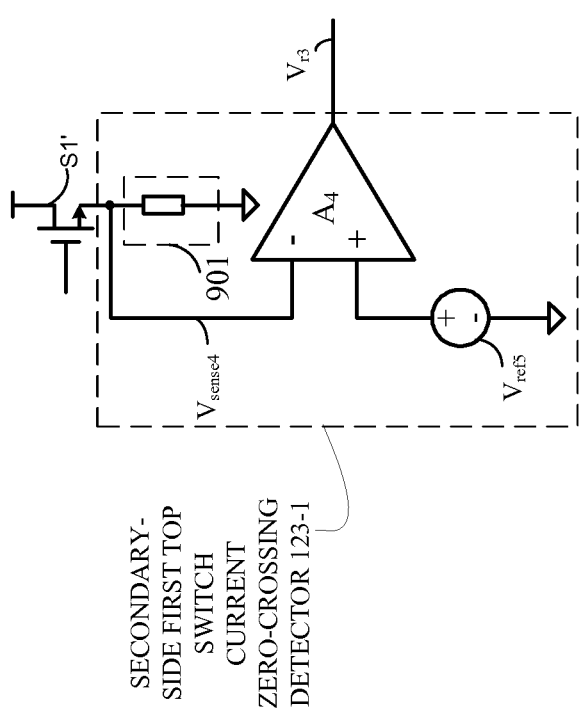
FIG. 9A shows a schematic diagram of an example secondary-side first top switch current zero-crossing detector in accordance with embodiments of the present invention.
Figure 9B:
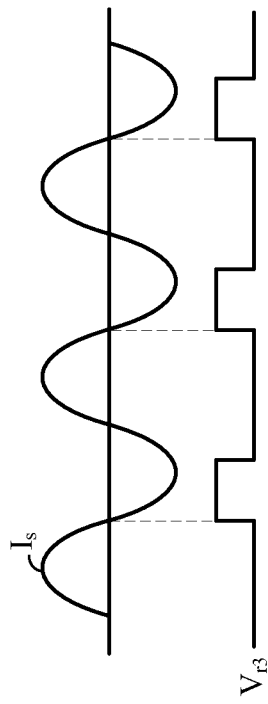
FIG. 9B shows example operation waveforms of a secondary-side second top switch current zero-crossing detector in accordance with embodiments of the present invention.

With reference to FIG. 9A and FIG. 9B, example schematic diagrams and associated example operation waveforms of a secondary-side first top switch current zero-crossing detector 123-1 are shown. Third current sampling circuit 901 couple with secondary-side first top switch S1' may be used for generating a fourth sense voltage $V_{sense4}$ to the inverting input of fourth comparator $A_4$. Fourth comparator $A_4$ may be used to generate a third reset signal $V_{r3}$ by comparing fourth sense voltage $V_{sense4}$ and fifth reference voltage $V_{ref5}$. Also, third reset signal $V_{r3}$ may be used to turn off secondary-side first top switch S1'.

Figure 10A:
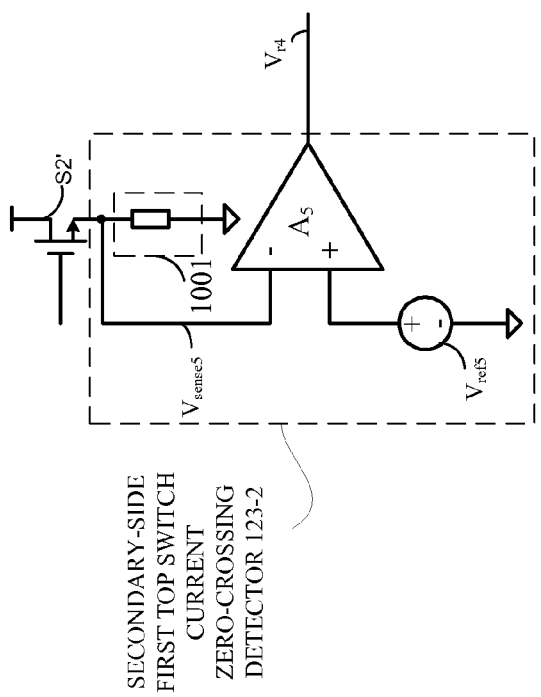
FIG. 10A shows a schematic diagram of an example secondary-side first top switch current zero-crossing detector in accordance with embodiments of the present invention.
Figure 10B:
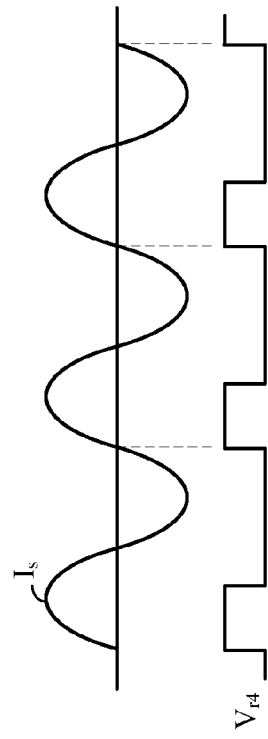
FIG. 10B shows example operation waveforms of a secondary-side second top switch current zero-crossing detector, in accordance with embodiments of the present invention.

With reference to FIG. 10A and FIG. 10B, schematic diagrams and example operation waveforms of a secondary-side first top switch current zero-crossing detector 123-2 are shown. Fourth current sampling circuit 1001 may be coupled with secondary-side second top switch S2' and used for generating a fifth sense voltage $V_{sense5}$ to the inverting input of fifth comparator $A_5$. Fifth comparator $A_5$ may be used to generate a fourth reset signal $V_{r4}$ by comparing fifth sense voltage $V_{sense5}$ and fifth reference voltage $V_{ref5}$. Also, fourth reset signal $V_{r4}$ may be used to turn off secondary-side second top switch S2'.

Figure 11A:
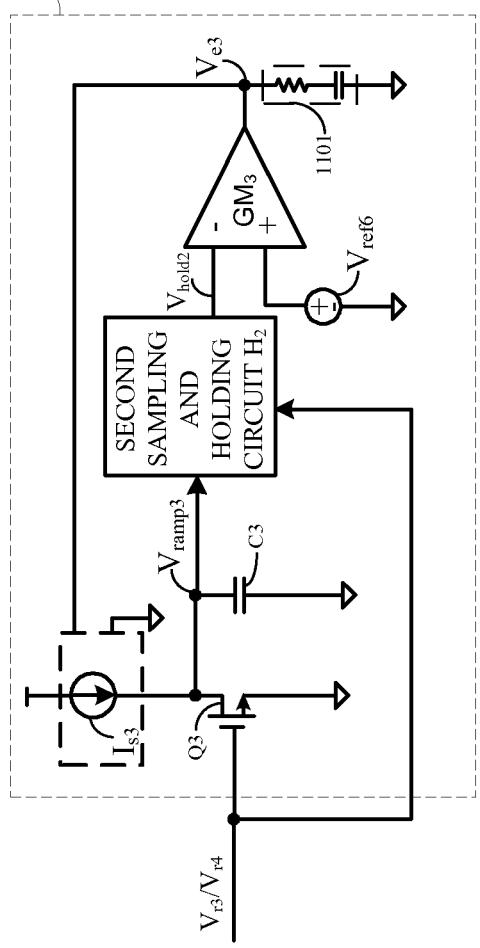
FIG. 11A shows a schematic diagram of an example secondary-side ramp generator in accordance with embodiments of the present invention.
Figure 11B:
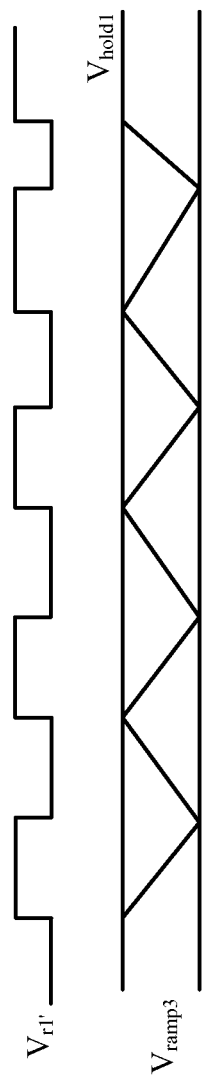
FIG. 11B shows example operation waveforms of a secondary-side ramp generator, in accordance with embodiments of the present invention.

With reference to FIG. 11A and FIG. 11B, a block diagram and example operation waveforms of a secondary-side ramp generator in accordance with embodiments of the present invention is shown. One difference between secondary-side ramp generator 126 and primary-side ramp generator 120 is that third switch $Q_3$ in the former can be controlled by third reset signal $V_{r3}$ or fourth reset signal $V_{r4}$.

Third adjustable current source $I_{s3}$ can provide a charging current for third capacitor $C_3$, and the charging and discharging of third capacitor $C_3$ may be controlled by third switch $Q_3$. Third switch $Q_3$ can be controlled by third reset signal $V_{r3}$ or fourth reset signal $V_{r4}$. Third ramp voltage $V_{ramp3}$ may be generated by charging and discharging third capacitor $C_3$. When third reset signal $V_{r3}$ or fourth reset signal $V_{r4}$ turns high, second sampling and holding circuit $H_2$ may be triggered to sample and hold the peak value of third ramp voltage $V_{ramp3}$ and generate a second holding voltage $V_{hold2}$. Third operational transconductance amplifier $GM_3$ can compare the second holding voltage $V_{hold2}$ with sixth reference voltage $V_{ref6}$, which can be compensated by third comparator 1101 to generate a third error voltage $V_{e3}$. Third error voltage $V_{e3}$ may be fed back to third adjustable current source $I_{s3}$ to regulate the charging current to keep the peak value of third ramp voltage $V_{ramp3}$ substantially constant. Also, for keeping the output current or output voltage of power transmitter 122 substantially constant, a constant current control circuit 127 and a constant voltage control circuit 128 may be employed.

Figure 12:
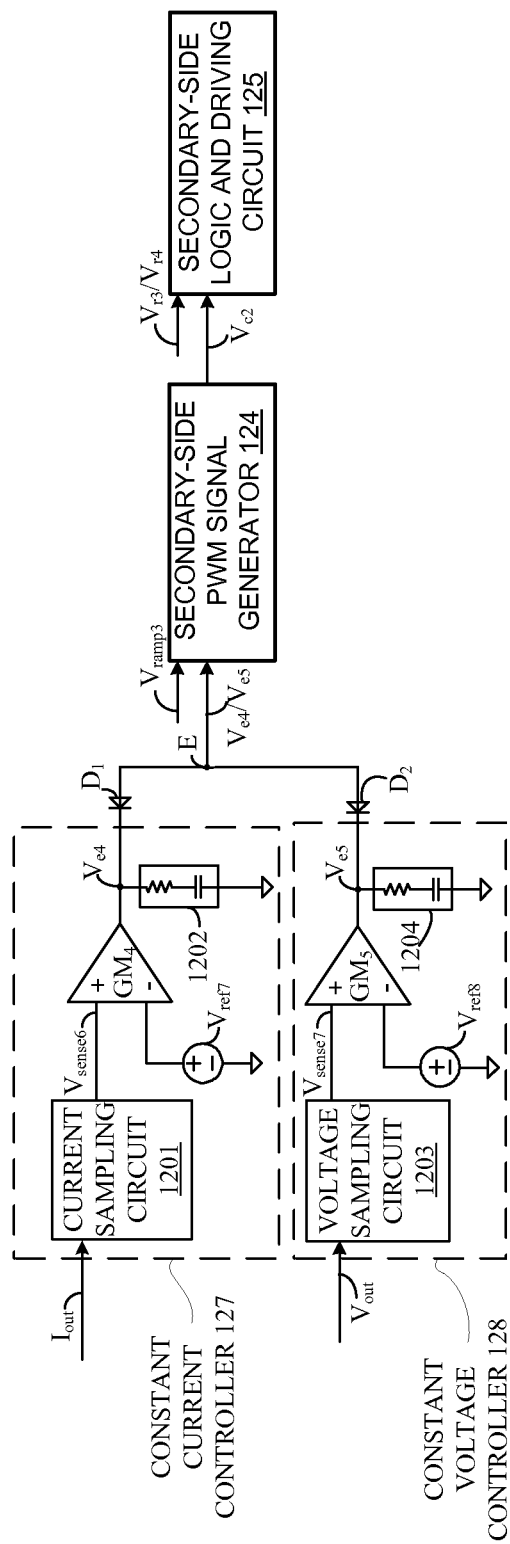
FIG. 12 shows a block diagram of an example constant current control circuit and a constant voltage control circuit in accordance with embodiments of the present invention.

With reference to FIG. 12, a block diagram of an example constant current control circuit and a constant voltage control circuit in accordance with embodiments of the present invention is shown. For example, constant current controller 127 can include a current sampling circuit 1201, fourth operational transconductance error amplifier $GM_4$, seventh reference voltage $V_{ref7}$, and fourth compensator 1202. Constant voltage controller 128 can include a voltage sampling circuit 1203, fifth operational transconductance error amplifier $GM_5$, eighth reference voltage $V_{ref8}$, and fifth compensator 1204.

Current sampling circuit 1201 can receive output current $I_{out}$ and output sixth sense voltage $V_{sense6}$ to the non-inverting input of fourth operational transconductance error amplifier $GM_4$. Seventh reference voltage $V_{ref7}$ may be input to the inverting input of fourth operational transconductance error amplifier $GM_4$. Fourth operational transconductance error amplifier $GM_4$ can output a fourth error voltage $V_{e4}$ after being compensated by fourth compensator 1202 to the cathode of first diode $D_1$. Voltage sampling circuit 1203 can receive output voltage $V_{out}$ and output a seventh sense voltage $V_{sense7}$ to the non-inverting input of fifth operational transconductance error amplifier $GM_5$. Eighth reference voltage $V_{ref8}$ may be input to the inverting input of fifth operational transconductance error amplifier $GM_5$. Also, fifth operational transconductance error amplifier $GM_5$ can output fifth error voltage $V_{e5}$ after being compensated by fifth compensator 1204 to the cathode of second diode $D_2$.

The anodes of first diode $D_1$ and second diode $D_2$ can be connected together at node E to output fourth error voltage $V_{e4}$ or fifth error voltage $V_{e5}$ to secondary-side PWM signal generator 124. When fourth error voltage $V_{e4}$ is lower than fifth error voltage $V_{e5}$, first diode $D_1$ can conduct, fourth error voltage $V_{e4}$ may be provided to the secondary-side PWM signal generator 124, and power receiver 12 works in a substantially constant current mode. In contrast, when fifth error voltage $V_{e5}$ is lower than fourth error voltage $V_{e4}$, second diode $D_2$ may conduct, fifth error voltage $V_{e5}$ may be provided to secondary-side PWM signal generator 124, and power receiver 12 works in a substantially constant voltage mode.

Secondary-side PWM signal generator 124 may be used to generate second PWM signal $V_{c2}$ after receiving third ramp voltage $V_{ramp3}$, fourth error voltage $V_{e4}$ and fifth error voltage $V_{e5}$ for secondary-side PWM signal generator 124 to turn off secondary-side bottom switches S3' and S4'.

Secondary-side logic and driving circuit 125 may be used to generate control signals for the switches of secondary-side full-bridge switching circuit in accordance with second PWM signal $V_{c2}$, third reset signal $V_{r3}$ and fourth reset signal $V_{r4}$. When third reset signal $V_{r3}$ is received, secondary-side logic and driving circuit 125 can generate a control signal to turn off secondary-side first top switch S1'. After a dead time, secondary-side first bottom switch S3' may be turned on by secondary-side logic and driving circuit 125, secondary-side first bottom switch S3' can be turned off when second PWM signal $V_{c2}$ is received. Then after a dead time, secondary-side first top switch S1' may be turned on again. The operations of secondary-side second top switch S2' and secondary-side second bottom switch may be the same or substantially similar to operation of secondary-side first top switch S1' and secondary-side first bottom switch S3'.

In particular embodiments, secondary-side switching current zero-crossing detector may be used to control the shut-off operation of the top switches and the conduction operation of the bottom switches, when the drain-source voltage of the top switches reaches to zero.

In particular embodiments, first current sampling circuit 401, second current sampling circuit 402, third current sampling circuit 901, and fourth current sampling circuit 1001, may be separately implemented by a resistor. Also, first compensator 501, second compensator 602, third compensator 1101, fourth compensator 1202 and fifth compensator 1204 may be separately implemented by a resistor coupled in series with a capacitor. Also, first selector 117-1 and second selector 117-2 may be separately implemented by an OR-gate. Further, those skilled in the art will recognize other circuits applicable to the present invention. In addition, switches discussed herein can be any semiconductor transistors, such as MOSFETs or BJTs, but not limited thereto.

The foregoing descriptions of specific embodiments of the present invention have been presented through images and text for purpose of illustration and description of the voltage controlled current source circuit and method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus, comprising:
    a) a sweep generator configured to generate a switching pulse signal to control operation of bottom switches of a primary-side full-bridge switching circuit during an initial operation process;
    b) a primary-side switching current zero-crossing detector configured to generate a primary-side current zero-crossing pulse signal when a primary-side switching current crosses zero;
    c) a primary-side pulse-width modulation (PWM) signal generator configured to generate a primary-side PWM signal in accordance with an input current to control a shut-off operation of top switches of said primary-side full-bridge switching circuit;
    d) wherein when in a first operation condition, a frequency of said switching pulse signal is higher than a frequency of said primary-side current zero-crossing pulse signal, and said switching pulse signal is configured to control a shut-off operation of said bottom switches of said primary-side full-bridge switching circuit; and
    e) wherein when in a second operation condition, the frequency of said switching pulse signal is lower than the frequency of said primary-side current zero-crossing pulse signal, and said primary-side current zero-crossing pulse signal is configured to control said shut-off operation of said bottom switches to maintain a power transmitter in a resonant state and an output voltage of said primary-side full-bridge switching circuit in phase with a current of a primary-side transmitter winding.

2. The apparatus of claim 1, further comprising an input current controller coupled between said primary-side full-bridge switching circuit and primary-side PWM signal generator to generate a second error voltage in accordance with an expected value and an input current of said primary-side full-bridge switching circuit.

3. The apparatus of claim 2, further comprising a primary-side ramp generator, wherein:

a) said primary-side ramp generator is configured to generate a second ramp voltage with a constant peak value in accordance with said switching pulse signal when in said first operation condition, b) said primary-side ramp generator is configured to generate a second ramp voltage with a constant peak value in accordance with said primary-side current zero-crossing pulse signal when in said second operation condition; and c) said primary-side PWM signal generator is configured to control operation of said top switches in accordance with said second ramp voltage and said second error voltage.

4. The apparatus of claim 3, wherein said primary-side ramp generator comprises:

a) a second switch coupled in series with a second adjustable current source, wherein operation of said second switch is complementary with operation of said bottom switches;

b) a second capacitor coupled in parallel with said second switch, wherein a voltage at a common node thereof is configured as said second ramp voltage;

c) a first sampling and holding circuit coupled to said common node of said second switch and said second capacitor, and configured to sample and hold said second ramp voltage to generate a first holding voltage;

d) a first operational transconductance amplifier configured to output a first error amplifier current in accordance with said first holding voltage and a third reference voltage; and e) a first compensator configured to generate a first error voltage by compensating said first error amplifier current to regulate said adjustable current source.

5. The apparatus of claim 2, wherein said input current controller comprises:

a) a sampling and filter circuit configured to detect an input current of said primary-side full-bridge switching circuit to generate a third sense voltage; and b) a second operational transconductance amplifier configured to amplify an error between said third sense voltage and a fourth reference voltage to generate said second error voltage by compensation of a second compensator coupled to an output of said second operational transconductance amplifier.

6. The apparatus of claim 1, wherein said sweep generator comprises:

a) a first switch coupled in series with a first adjustable current source;

b) a first capacitor coupled in parallel with said first switch;

c) a first comparator configured to compare a voltage at a common node of said first switch and said first capacitor with a first reference voltage to generate a first pulse signal;

d) a frequency divider coupled to receive said first pulse signal, and configured to generate two switching pulse signals to control operation of said bottom switches; and e) a single pulse generator coupled to receive said first pulse signal, and configured to generate a single pulse signal to control operation of said first switch.

7. The apparatus of claim 1, further comprising a power receiver coupled to said power transmitter, wherein said power receiver comprises:

a) a secondary-side receiving winding coupled magnetically to said primary-side transmitting winding to receive a current of said primary-side transmitting winding;

b) a secondary-side full-bridge switching circuit coupled between said secondary-side winding and a load;

c) a secondary-side switching current zero crossing detector configured to generate a secondary-side current zero-crossing pulse signal when a secondary-side switching current crosses zero to control a shut-off operation of top switches of said secondary-side full-bridge switching circuit; and d) a secondary-side PWM signal generator configured to generate a secondary-side PWM signal in accordance with an output voltage or an output current of said secondary-side full-bridge switching circuit to control a shut-off operation of bottom switches of said secondary-side full-bridge switching circuit.

8. The apparatus of claim 7, further comprising:

a) a constant voltage controller configured to generate a fourth error voltage in accordance with said output voltage of said secondary-side full-bridge switching circuit and a first expected value; and b) a constant current controller configured to generate a fifth error voltage in accordance with an output current of said secondary-side full-bridge switching circuit and a second expected value, wherein a lower of said fourth error voltage and said fifth error voltage is configured to be provided to said secondary-side PWM signal generator.

9. The apparatus of claim 7, further comprising a secondary-side ramp generator configured to generate a third ramp voltage having a constant peak value, wherein said secondary-side PWM signal generator is configured to output said secondary-side PWM signal in accordance with said third ramp voltage and an error signal.

10. The apparatus of claim 9, wherein said secondary-side ramp generator comprises:

a) a third switch coupled in series with a third adjustable current source, wherein operation of said third switch is complementary with operation of said top switches of said secondary-side full-bridge switching circuit;

b) a third capacitor coupled in parallel with said third switch, wherein a voltage at a common node thereof is configured as said third ramp voltage;

c) a second sampling and holding circuit coupled to said common node of said third switch and said third capacitor, and configured to sample and hold said third ramp voltage to generate a second holding voltage;

d) a third operational transconductance amplifier configured to output a third error amplifier current in accordance with said second holding voltage and a sixth reference voltage; and e) a second compensator configured to generate a third error voltage by compensating said third error amplifier current to regulate said third adjustable current source.

11. The apparatus of claim 7, wherein said secondary-side switching current zero-crossing detector is configured to generate a secondary-side current zero-current crossing pulse signal to control said shut-off operation of said top switches of said secondary-side full-bridge switching circuit when a drain-source voltage of said top switches of said secondary-side full-bridge switching circuit reaches zero.

* * * * *